United States Patent [19]

Yamanaka

[11] Patent Number: 5,661,569
[45] Date of Patent: Aug. 26, 1997

[54] FACSIMILE ADAPTER UNIT HAVING ERROR DETECTING FUNCTION

[75] Inventor: Kazunobu Yamanaka, Kawasaki, Japan

[73] Assignee: Ricoh Company, Ltd., Tokyo, Japan

[21] Appl. No.: 663,467

[22] Filed: Mar. 4, 1991

[30] Foreign Application Priority Data

Mar. 5, 1990 [JP] Japan .................................. 2-51846

[51] Int. Cl.$^6$ ........................................... H04N 1/32
[52] U.S. Cl. .......................... 358/442; 358/405; 358/439; 358/468
[58] Field of Search ............................ 358/400, 401, 358/405, 442, 468, 434, 439; 379/100; H04N 1/32

[56] References Cited

U.S. PATENT DOCUMENTS

| | | | |
|---|---|---|---|
| 4,325,085 | 4/1982 | Gooch | 358/261.2 |
| 4,623,936 | 11/1986 | Urban et al. | 358/470 |
| 4,964,154 | 10/1990 | Shimotono | 379/100 |
| 5,041,917 | 8/1991 | Koshiishi | 343/434 |
| 5,041,918 | 8/1991 | Ishida et al. | 358/442 |
| 5,153,746 | 10/1992 | Satoh | 358/401 |

FOREIGN PATENT DOCUMENTS

| | | | |
|---|---|---|---|
| 0014513 | 2/1978 | Japan | 358/442 |
| 0080973 | 7/1981 | Japan | 358/405 |
| 0025769 | 2/1982 | Japan | 358/405 |
| 0179059 | 10/1983 | Japan | 358/405 |
| 0101968 | 6/1984 | Japan | 358/405 |
| 0171362 | 9/1984 | Japan | 358/405 |
| 0006982 | 1/1986 | Japan | 358/405 |

*Primary Examiner*—Thomas L. Stoll
*Attorney, Agent, or Firm*—Oblon, Spivak, McClelland, Maier & Neustadt, P.C.

[57] ABSTRACT

A facsimile adapter unit which is coupled to a host system and a line and used for communicating between the host system and a station coupled to the line. The facsimile adapter unit includes a decoder for decoding image data which is transmitted from the station via the line and for outputting decoded image data, an error detection unit for detecting an error in the decoded image data, and a processing unit for sending the host system the decoded image data when the error detection unit does not detect the error in the decoded image data and, when the error is detected, for sending the host system information representing that an error is generated in the decoded image data instead of the decoded image data in which the the error is detected.

8 Claims, 5 Drawing Sheets

FACSIMILE ADAPTER UNIT HAVING ERROR DETECTING FUNCTION

BACKGROUND OF THE INVENTION

The present invention generally relates to a facsimile adapter unit having an error detecting function, and more particularly to a facsimile adapter unit having an error detecting function which is connected between a host system and a line, carries out a facsimile transmission procedure and shapes image information data received via the line into predetermined unit data rows.

Recently, a facsimile adapter unit connected to a host system such as a personal computer system has been put into practical use. The facsimile adapter is used for adding a function of a facsimile communication to the host system.

As the image data has a huge amount of information, coded image data is communicated between the host system and the facsimile adapter unit, and in general, the number of processes, in the facsimile adapter unit, for transmitting image data received via the line to the host system, become huge when the facsimile adapter decodes the received image data into an original image data and transmits the decoded image information. Therefore, conventionally, the facsimile adapter unit transmits the received image data to the host system without decoding it.

In addition, in a conventional facsimile adapter, the received image data having a plurality of bits is divided into predetermined unit data, such as the bite data and the word data, for being processed in the host system. Also a FILL signal for minimizing the time required for transmitting image information for one line is removed from the received image data.

However, the above conventional facsimile adapter unit has the following disadvantages.

As the conventional facsimile adapter unit has no function for decoding the image data, it is impossible to detect errors in the received image data. Hence, the host system carries out an error detection process for detecting errors in the image data by use of software thereof. Thus, the error detection process is carried out in accordance with the software of the host system, so that a long time is required for the error detection process. As a result, a long time is required to perform processes, including the error detection process, which continues from the time at which the host system receives the image data for one page to the time at which the host system returns a receiving result representing whether or not the received image data has errors to the party station. That is, the time required for a communication between the host system and the party station coupled to the line becomes long.

SUMMARY OF THE PRESENT INVENTION

Accordingly, a general object of the present invention is to provide a novel and useful facsimile adapter unit in which the disadvantages of the aforementioned prior art are eliminated.

A more specific object of the present invention is to provide a facsimile adapter unit capable of decreasing the load of the host system and decreasing the time required for transmitting the image data in the host system.

The above objects of the present invention are achieved by a facsimile adapter unit which is coupled to a host system and a line and used for communicating between the host system and a station coupled to the line, the facsimile adapter unit comprising: decoding means for decoding image data which is transmitted from the station via the line and for outputting decoded image data; error detection means, coupled to said decoding means, for detecting an error in the decoded image data; and processing means, coupled to the decoding means and the error detection means, for sending the host system the decoded image data when the error detection means does not detect the error in the decoded image data, and, when the error is detected, for sending the host system information representing that an error has been generated in the decoded image data instead of the decoded image data in which the error is detected.

Additional objects, features and advantages of the present invention will become apparent from the following detailed description when read in conjunction with the accompanying drawings.

DESCRIPTION OF THE PREFERRED EMBODIMENTS

A description will now be given of an embodiment of the present invention with reference to the accompanying drawings.

Figure 1:
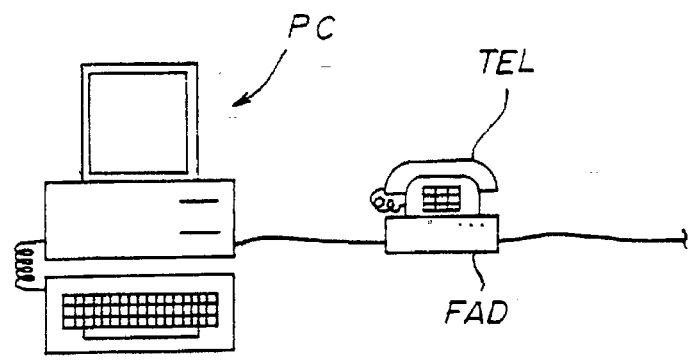
FIG. 1 is a diagram showing a host system and a facsimile adapter unit connected to the host system.

In FIG. 1, which shows a system having a facsimile adapter unit, the facsimile adapter unit FAD is connected to a personal computer PC which is a host system. The facsimile adapter FAD is also connected to a telephone TEL so that it is possible to speak over the telephone TEL. The facsimile adapter FAD has, for example, a facsimile transmission function of the group three (G3).

Figure 2:
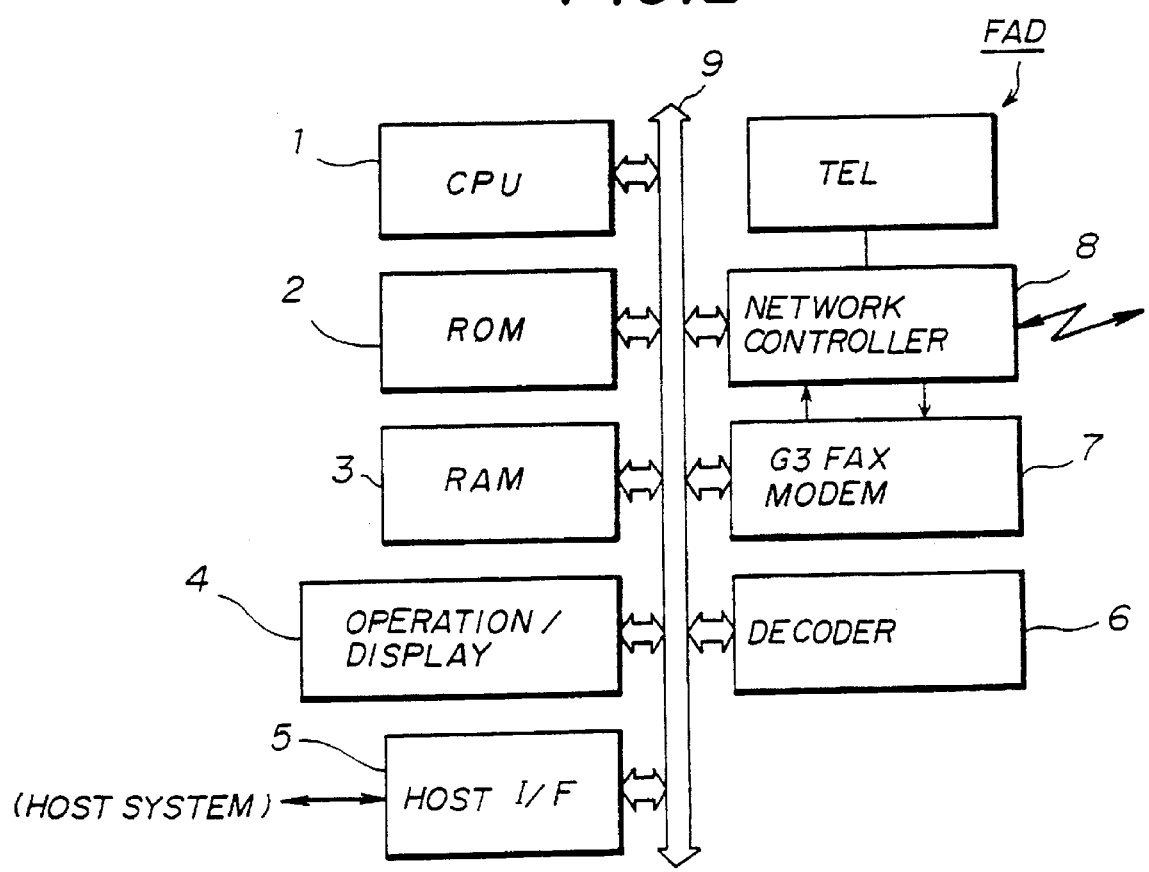
FIG. 2 is a block diagram illustrating a facsimile adapter unit according to an embodiment of the present invention.

FIG. 2 illustrates a structure of the facsimile adapter FAD.

Referring to FIG. 2, the facsimile adapter unit FAD has a CPU (central processing unit) 1, a ROM (read only memory) 2, a RAM (random access memory) 3, an operation/display unit 4 and a host system interface 5. The facsimile adapter unit FAD also has a decoder 6, a G3 facsimile modem 7 and a network controller 8.

The CPU 1 controls various parts of this facsimile adapter unit FAD and carries out processes for transmitting and receiving the image information in accordance with the facsimile transmission control procedure. The ROM 2 stores control programs which are used by the CPU 1 and various data which is used in the control programs and the like. In the RAM 3, working areas used by the CPU 1 are formed. The operation/display unit 4 is operated by a user when this facsimile adapter unit FAD is being used, and information indicating states of this facsimile adapter unit FAD are displayed in the operation/display unit 4. The host system interface 5 is connected to the host system (personal computer PC) and communicates various data to the host system. The RAM 3 has an area for storing a received image information which is coded. The decoder 6 decodes the coded image data into an original image signal. The G3 facsimile modem 7 has a G3 modem function including a low speed modem function (V.21 modem) for transmitting and receiving transmission procedure signals and a high speed modem function (V.29 modem, V.27ter modem) for mainly transmitting and receiving image information. The network controller 8 connects this facsimile adapter unit to the line and the telephone TEL is connected to the network controller 8.

The CPU 1, the ROM 2, the RAM 3, the operation/display unit 4, the host system interface 5, the decoder 6, the G3 facsimile modem 7 and the network controller 8 are connected to a system bus 9, and mainly communicate via the system bus 9 with each other. Data is directly transmitted from the network controller 8 to the G3 facsimile modem 7, and vice versa.

Figure 3:
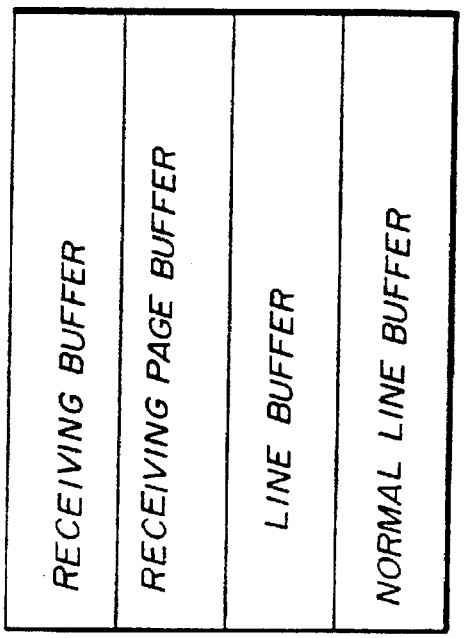
FIG. 3 is a diagram illustrating areas in a RAM, shown in FIG. 2, which are used when receiving the image information.

The RAM 3 has a receiving buffer, a receiving page buffer, a line buffer and a normal line buffer as shown in FIG. 3. When the facsimile adapter unit receives the image data via the line, the received data from the G3 facsimile modem 7 is stored in the receiving buffer. The received data for one page is stored in the receiving page buffer, the received data for one line which is being processed is stored in the line buffer and the received data for one line which has no errors is stored in the normal line buffer.

Figure 4:
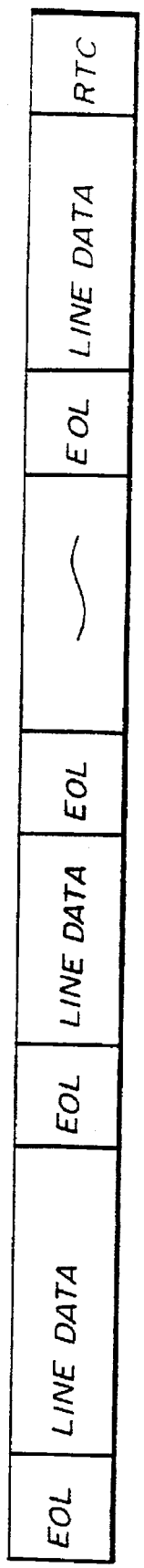
FIG. 4 is a diagram illustrating an example of a structure of the image information.

A format of the image data treated by the G3 facsimile is shown in FIG. 4. The image information shown in FIG. 4 is coded on the basis of the modified Huffman coding scheme (MH coding). Image information which is obtained by scanning an original document at a predetermined resolution is coded by the line. This coded image data has the format shown in FIG. 4. A line end signal EOL denoting a boundary between two adjacent line image data is provided on the leading end of the line image data. A return control signal RTC denoting an end of the image data for one page is provided in the coded image data. The control signal RTC is formed of six line end signals EOL.

When another facsimile unit calls this facsimile adapter unit FAD and the network controller 8 detects the call, the CPU 1 responds to the call. Then the facsimile adapter unit FAD starts to carry out the G3 facsimile transmission procedure. After that, processes for negotiating transmission conditions are carried out between the other facsimile unit and this facsimile adapter unit FAD, and training of the G3 facsimile modem 7 is carried out. After this training, the facsimile adapter FAD receives the image information transmitted via the line from the other facsimile unit. In the facsimile adapter unit FAD, the received image data is supplied via the G3 facsimile modem 7 to the receiving buffer in the RAM 3.

Figure 5A:
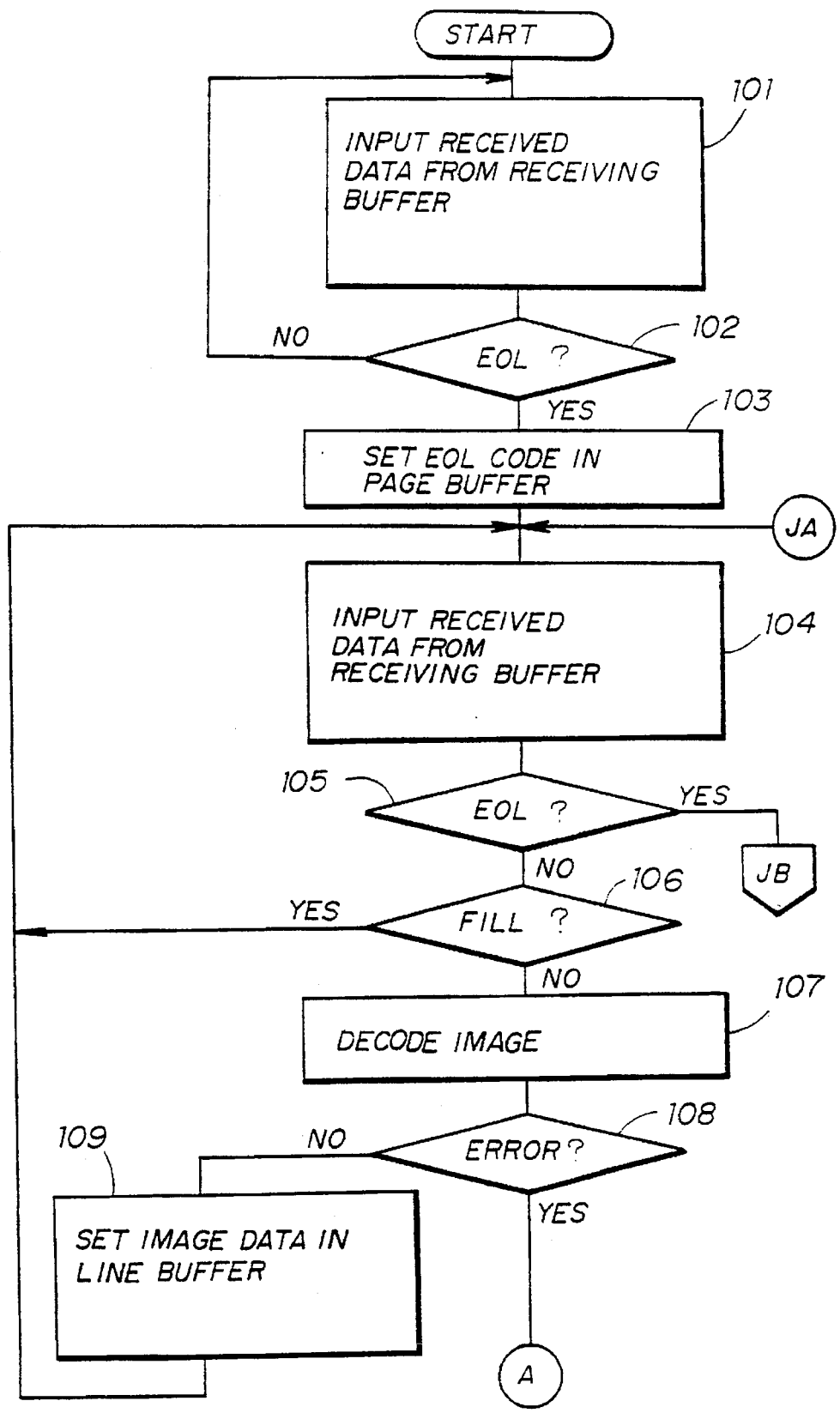
FIGS. 5A, 5B and 5C are flow charts illustrating procedures when receiving the image information.
Figure 5B:
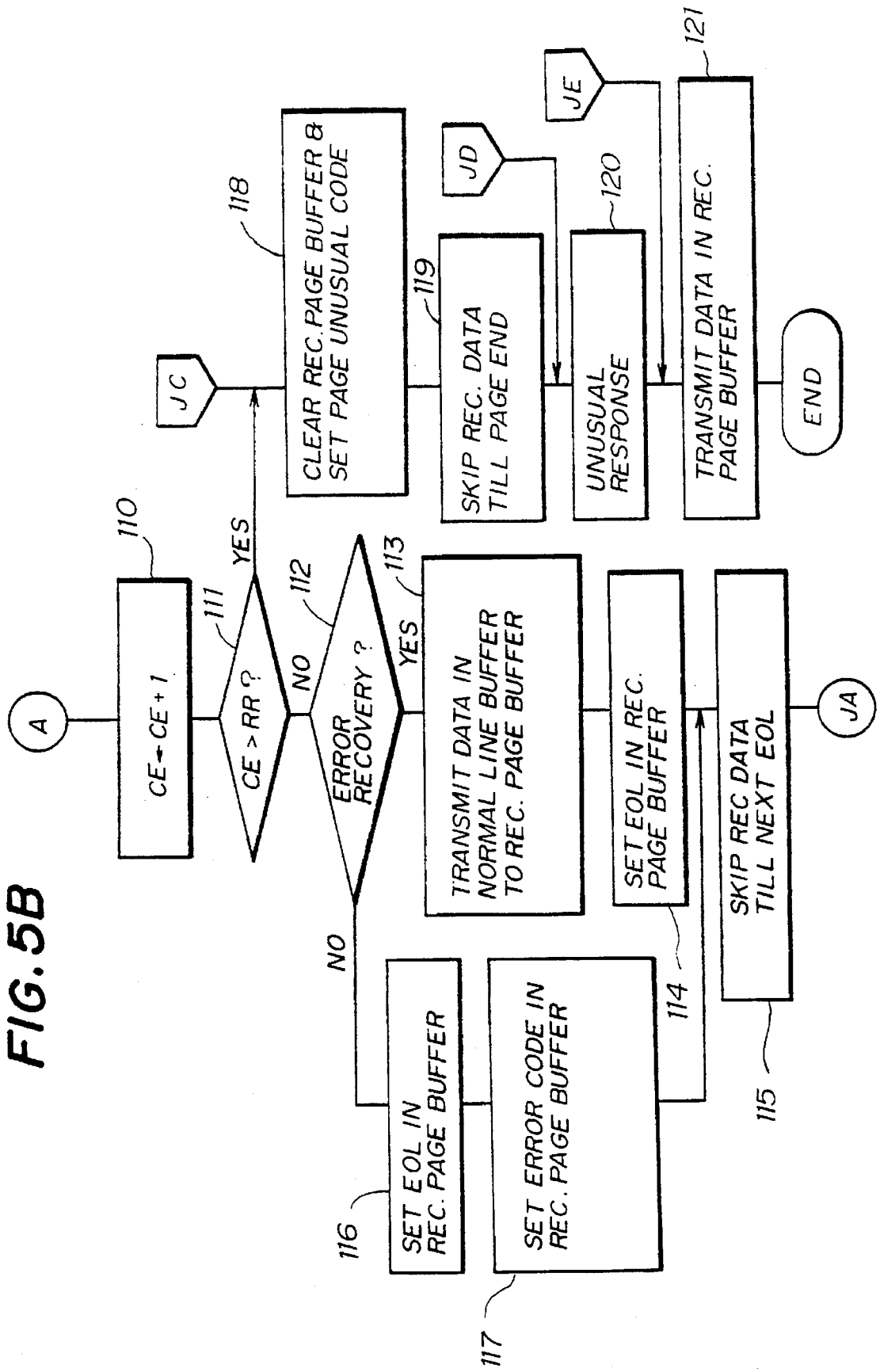
Figure 5C:
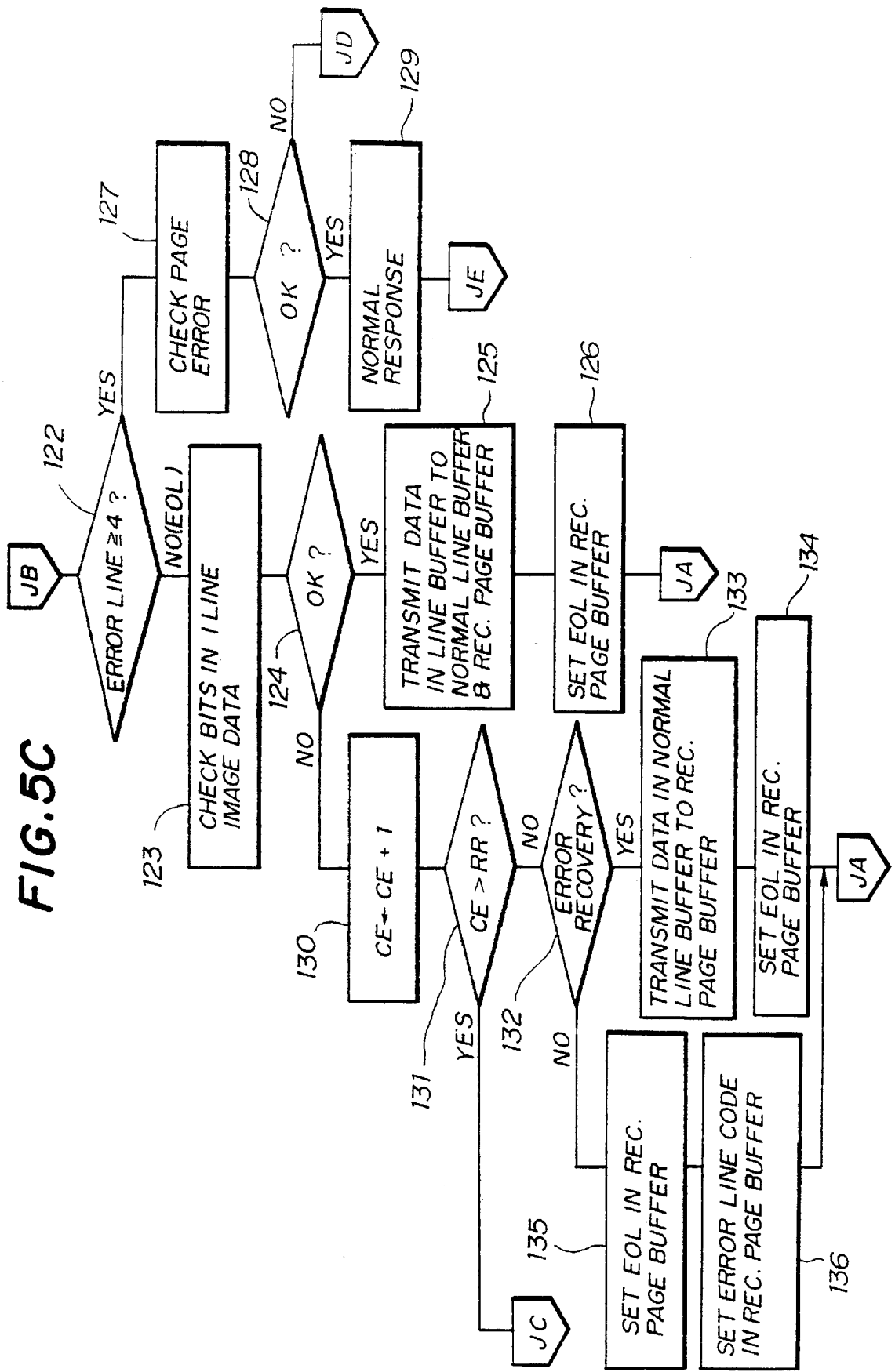

While the image information is being received by the facsimile adapter unit FAD, the CPU 1 carries out processes for each page in accordance with the procedure shown by the flow charts in FIGS. 5A, 5B and 5C. Then the CPU 1 transmits the received image data obtained by the processes to the host system.

In an initial process, an error counter CE, which is used for storing the number of detected errors, is cleared to "0", and the contents in the receiving page buffer, the line buffer and normal line buffer are respectively removed. After the initial process, the processes shown in FIGS. 5A, 5B and 5C are performed.

Referring to FIG. 5A, step 101 inputs the received data from the receiving buffer, and step 102 determines whether or not the line end signal EOL is provided on the leading end of the received data for one page. When the line end signal EOL is provided on the leading end of the received data, that is the result in step 102 is YES, step 103 sets code data denoting the line end signal EOL in a front portion of a free area in the receiving page buffer. Hereinafter, this code data is referred to as an EOL code.

When the line end signal EOL provided on the leading end of the received data for one page is detected as has been described above, further step 104 inputs the received data from the receiving buffer, and step 105 determines whether or not the received data is the line end signal EOL. When the result obtained in step 105 is NO, step 106 determines whether or not the received data is the FILL signal which should be detected after the line end signal EOL. When the received data is not the line end signal EOL and not the FILL signal so that the result in step 106 is NO, step 107 makes the decoder 6 decode the received image data into the original image data. Then step 108 determines whether or not errors have been generated while the received image data is being decoded. When the result in step 108 is NO, step 109 stores the image data which is normally decoded in step 107 in a front portion of the line buffer, and then the process returns to step 104. Then processes in steps 104 through 109 are sequentially carried out.

When step 108 detects errors in the coded image data and the result in step 108 is YES, the process proceeds to that shown in FIG. 5B. That is, step 110 makes the error counter CE count up by one. Then step 111 determines whether or not a count value in the error counter CE is greater than a predetermined reference value RR. When the count value in the error counter CE is less than the reference value RR so that the result in step 111 is NO, step 112 determines whether or not an error recovery mode is set. This error recovery mode can be set in the facsimile adapter unit FAD based on an instruction from the host system. In the error recovery mode, when the error has been generated in the image data for one line, the normal image data for a previous one line is substituted for the image data having the errors.

That is, when the result in step 112 is YES, step 113 supplies the image data for a previous one line, which has been stored in the normal line buffer as will be described later, to a front portion of a free area in the receiving page buffer. Then step 114 sets the EOL code in a free area in the receiving page buffer, and step 115 makes the receiving buffer stop storing the received image data until the line end signal EOL for next line is detected. After that, the process returns to step 104 shown in FIG. 5A.

On the other hand, when the error recovery mode is not set so that the result in step 112 is NO, after step 116 sets the EOL code in a front portion of a free area in the receiving page buffer, step 117 sets an error code in the receiving page buffer, which code represents that the received image data for one line has an error. Then the process proceeds to step 115.

When the count value in the error counter CE is greater than the reference value RR so that the result in step 111 is YES, step 118 clears the contents in the receiving page buffer and sets a page unusual code which represents that the received image data for one page has an error in the receiving page buffer. Then step 119 makes the receiving buffer stop storing the received image data, and step 120 returns a Retrain Negative signal RTN which represents that errors have been generated to the calling facsimile unit. After that, step 121 transmits the contents in the receiving page buffer to the host system.

In FIG. 5A, when the line end signal EOL is detected so that the result in step 105 is YES, the process proceeds to that shown in FIG. 5C. That is, step 122 determines whether or not four or more line end signals EOL are successively detected. When four or more line end signals EOL are not successively detected so that the result in step 122 is NO, step 123 counts the number of bits in the received image data for one line which is supplied from the receiving buffer. Then step 124 determines whether or not the received image data for one line is normal based on the number of bits therein obtained in step 123. When the result in step 124 is YES, the received image data for one line stored in the line buffer is transferred to both the normal line buffer and the receiving page buffer in step 125. That is, the normal received image data is stored in both the normal line buffer and a front portion of a free area in the receiving page buffer. After that, step 126 sets the EOL code in a front portion of the free area in the receiving page buffer, then the process returns to step 104 so that the process with respect to the next line is carried out.

On the other hand, when four or more line end signals EOL corresponding to the return control signal RTC are successively detected so that the result in step 122 is YES, step 127 checks the number of successive image lines having errors and step 128 determines whether the number of the successive image lines having the errors obtained in step 127 is equal to or less than a predetermined reference number. When there is not a page error in which the number of the successive image lines having errors is greater than the reference value so that the result in step 128 is YES, step 129 returns a Message Confirmation signal MCF which represents that the image data for one page has been normally received by the calling facsimile unit. Then the process proceeds to step 121 shown in FIG. 5B.

When the number of bits in the image data for one line is not equal to the predetermined reference value so that the result in step 124 is NO, step 130 increments the count value by one in the error counter CE. Then step 131 determines whether or not the count value in the error counter CE is greater than the reference value RR. When the result in step 131 is NO, step 132 determines whether or not the error recovery mode is set. When the result in step 132 is YES, step 133 transfers the image data for one line stored in the normal line buffer to a front portion of a free area in the receiving page buffer and step 134 sets the EOL code in a free area in the receiving page buffer. After that, the process returns to step 104 shown in FIG. 5A.

On the other hand, when the error recovery mode is not set so that the result in step 132 is NO, step 135 sets the EOL code in a free area in the receiving page buffer and then step 136 sets an error line code which represents that an error has been generated in the received image data for one line in the receiving page buffer. After that, the process returns to step 104 shown in FIG. 5A.

In addition, when the result in step 131 is YES, the process proceeds to step 118 shown in FIG. 5B.

As has been described above, in the facsimile adapter unit FAD according to this embodiment, the received image data is decoded by the decoder 6 and the process for detecting errors in the received image data is carried out while the image data is being received. Then the received image data in which errors are not detected is successively stored in both the receiving page buffer and the normal line buffer in the RAM 3. In addition, the line end signal EOL in the received image data is converted into the EOL code having one bite and stored in the receiving page buffer. On the other hand, when the error recovery mode is set, the image data for one line in which the errors are detected is changed to the image data for a previous one line which has been normally received and stored in the normal line buffer. Furthermore, when the total number of image lines having errors is greater than a first reference value, or when the number of successive image lines having errors is greater than a second reference number even if the total number of the image lines having errors is not greater than the first reference value, it is determined that the image data for one page has not been normally received. Thus, the error message, which represents that errors have been generated in the image data for one page, is returned to the calling facsimile unit, and the contents in the receiving page buffer are cleared. Then the page unusual code is set in the receiving page buffer.

When the operation of receiving the image information for one page is completed, the facsimile adapter unit FAD informs the host system about the contents in the receiving buffer. As a result, in a case where the host system receives the page unusual code from the facsimile adapter unit FAD, the host system can determine that the image data has not been normally received. In other cases, the host system further decodes the received data from the facsimile adapter unit FAD and obtains the original image data which is transmitted from the calling facsimile unit.

According to the embodiment, the facsimile adapter unit FAD independently carries out the transmission procedure with respect to the calling facsimile unit, so that it is possible for the host system to decrease the time required for the transmission procedure. In addition, it is possible to decrease the load of the host system so that facsimile communication can be smoothly performed.

When the error recovery mode is set, the normal image data for a previous one line is substituted for the received image data having the errors for one line. Thus, it is unnecessary for the host system to carry out the process for correcting the image data having the errors, so that it is possible to further decrease the load of the host system.

In the embodiment, an operation in a case in which the image data is received has been explained. But, in a case in which the image data is transmitted, the facsimile adapter FAD transmits the image data supplied from the host system via the line to a destination in the same manner as in the conventional system.

It is also possible to code the image data in accordance with a coding scheme other than the MH coding scheme, such as a MR (modified Read) coding scheme or a MMR (modified MR) coding scheme.

The facsimile adapter unit according to the present invention can also have a facsimile transmission function of the group four (G4).

The present invention is not limited to the aforementioned embodiments, and variations and modifications may be made without departing from the scope of the claimed invention.

What is claimed is:

1. A facsimile adapter unit which is coupled to a host system and a line and is used for communicating between said host system and a station coupled to the line, said facsimile adapter unit comprising:

decoding means for decoding image data which is transmitted from the station via the line and for outputting decoded image data;

error detection means, coupled to said decoding means, for detecting an error in the decoded image data for each line;

data determining means, coupled to said error detection means, for determining whether or not page image data which has image data for a plurality of lines is normal based on results obtained by said error detection means with respect to image data for the plurality of lines in the page data;

first processing means, coupled to said data determining means, for sending said host system image data for each line in which no error is detected and code data corresponding to each line of image data for which the error is detected by said error detection means when said data determining means determines that the page image data is normal;

second processing means, coupled to said data determining means, for sending said host system error page information including image data for each line in which no error is detected and the code data corresponding to each line of image data for which the error is detected when said data determining means determines that the page image data is not normal; and third processing means, coupled to said data determining means, for returning, to said station coupled to the line, information indicating that errors are present in image data transmitted from said station.

2. A facsimile adapter unit as claimed in claim 1, wherein said error detection means has checking means for checking a number of bits in image data for each line, and wherein said error detection means detects the error when the number of bits checked by said checking means is not equal to a predetermined value.

3. A facsimile adapter unit as claimed in claim 1, wherein said data determining means includes counter means for counting a number of lines of image data for which errors have been detected by said error detection means, and wherein said determining means determines whether or not the page image data is normal based on a count value obtained by said counter means.

4. A facsimile adapter unit as claimed in claim 1, wherein said data determining means has determining means for determining whether or not a number of lines of image data for which errors have been detected is greater than a reference value, the lines being successively arranged, and wherein said data determining means determines that the page image data is not normal when said determining means determines that the number of lines is greater than the reference value.

5. A facsimile adapter unit as claimed in claim 1, further comprising error recovery means for recovering image data for each line in which the error is detected by said error detection means, wherein image data for each line recovered by said error recovery means is sent to the host system instead of the code.

6. A facsimile adapter unit as claimed in claim 5, wherein said error recovery means has first storage means for successively storing image data for each line in which no error is detected, and substituting means for substituting image data of a first line stored in said first storage means for image data of a second line in which the error has been detected by said error detection means when said error detection means detects the error in the image data of the second line.

7. A facsimile adapter unit as claimed in claim 6, wherein said first storage means has a line buffer capable of storing image data for one line, and wherein image data for each line in which no error is detected is stored in said line buffer.

8. A facsimile adapter unit as claimed in claim 1, further comprising storage means having a capacity for storing image data for the plurality of lines included in the page image data, wherein said first processing means stores image data for lines in which no errors are detected and the code data corresponding to lines for which errors are detected, the image data and the code data stored in said storage means being sent to said host system.

* * * * *